Dec. 14, 1937.                C. M. ROY                 2,102,282
AUTOMATIC APPARATUS FOR DETERMINING THE HARDNESS OF WATER
                    Filed April 25, 1936
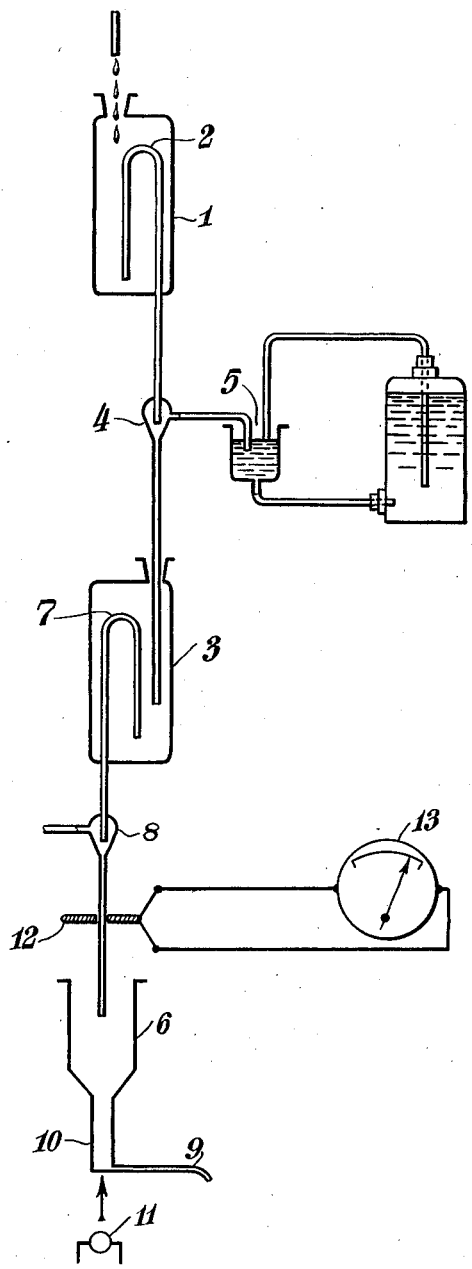
INVENTOR:
CECILE MARGUERITE ROY
BY: Ruege + Boyce
ATTORNEYS Patented Dec. 14, 1937

2,102,282

UNITED STATES PATENT OFFICE 2,102,282

AUTOMATIC APPARATUS FOR DETERMINING THE HARDNESS OF WATER

Cecile Marguerite Roy, Meudon, France, assignor to Societe des Usines Chimiques Rhone-Poulenc, Paris, France Application April 25, 1936, Serial No. 76,319

5 Claims. (Cl. 23—253)

This invention relates to an automatic apparatus for determining the hardness of water, and is particularly valuable in connection with the feeding of boilers.

For several years the pressure and specific evaporation in boilers have been increased progressively. This has resulted in great precautions having to be taken as regards the purity of the water which is going to be fed into the boiler to such an extent that many manufacturers hesitate to use purified water and feed their boilers entirely on distilled water in all cases where the water in the boilers must be renewed continually. The employment of sodium phosphate to give the purified water the requisite qualities is well known but this method requires constant supervision. Since it is absolutely necessary that the heating mechanism should be stopped as soon as the purification is no longer perfect, it will be seen that it is of the greatest advantage to provide an apparatus which gives an automatic reading of the hardness of the water.

According to the usual method the hardness of water is determined by adding to a sample of the water a solution of soluble soap in small quantities. This addition of soap solution is stopped as soon as a persistent lather is obtained. It is known that the quantity of soap solution that must be added to produce this persistent lather depends on the quantity of calcium and magnesium salts in the water and is proportional to the hardness of the water, expressed in degrees of hardness.

Up to the present the application of this method has necessitated the employment of an operator in order to take out a sample of the water, mix it with the soap solution, shake it, and read the burette containing the soap solution. The method has not hitherto lent itself to automatic control.

The apparatus which is the subject of the present invention has for its object to overcome this disadvantage. It is distinguished from the methods that have been carried out up to the present day in that, while employing in principle the method of determining hardness by production of lather it is entirely automatic, calls for no supervision and permits a very accurate reading. It can take the form of a recording apparatus or an alarm, or it may be adapted to give a direct reading.

According to this invention the recording of the quantity of lather produced and its persistence is effected by means of a photo-electric cell. At regular intervals of time a fixed quantity of soap solution which can be varied according to the range of hardness which is to be recorded is mixed with a fixed quantity of water; the mixture is then shaken up with air in order to produce a lather. The lather when formed is traversed by a beam of an electromagnetic radiation which impinges on a photo-electric cell. In the absence of lather the cell receives a maximum intensity of the radiation and gives in consequence a strong electric current. As soon as the lather is formed it absorbs and diffuses a part of the radiation, and reduces by this amount, the intensity of the radiation reaching the cell. The diminution of the electric current corresponding to the diminution in the intensity of the radiation reaching the cell depends on the quantity of lather formed. The persistence of the lather is shown by the persistence of the current change. It is possible to construct and regulate the apparatus to be very sensitive to small changes in the current. This results in a high degree of accuracy in the readings.

The strength of the electric current indicated on the band of a recording galvanometer shows immediately the formation, the abundance, and the persistence of the lather. Large current readings correspond to the disappearance of the lather (very hard water) while small readings in the neighbourhood of zero show large quantities of lather (soft water). When the lather persists the current remains at its minimum value. It is possible to take a reading of the degree of hardness of water in a very short time, the calibration of the instrument depending on the quantity of soap solution on each occasion.

In certain instances a simple direct reading galvanometer can replace the recording instrument.

According to the invention it is possible to substitute or add a suitable warning device such as a bell, tell-tale, or lamp, regulated, for example, to signal as soon as a predetermined current is reached, corresponding to the maximum permissible hardness.

Where such a warning device is employed it is necessary to ensure that while the hardness of the water remains below the predetermined danger level, the electromagnetic radiation always passes through a column of lather before reaching the cell: otherwise the warning device would be actuated between each fresh formation of lather.

Thus the lather formed may be held in a receptacle of appropriate form, and the quantity of soap solution admitted on each occasion regulated so that some lather always remains in the receptacle so long as the hardness of the water remains below the predetermined danger level. Alternatively the source of electromagnetic radiations may be adapted to operate for a definite interval of time after each fresh formation of the lather, so that if the lather persists for that length of time, the warning device is not actuated.

In the accompanying drawing one form of the invention is shown by way of example;

In order to take a reading on the principal supply pipe, the water is arranged to fall, drop by drop into the upper vessel 1, the capacity of which as well as the rate of introduction of the water depends on the chosen frequency for each fresh formation of lather. As soon as the water reaches the upper level of the syphon 2 it is transferred rapidly into the middle or mixing vessel 3 carrying with it by means of the suction injector 4 a fixed quantity of soap solution. The small vessel 5 communicates through its base to the reserve solution in a Mariotte flask 5'. The air admission tube passing through the stopper of the Mariotte flask 5' dips into the solution in the small vessel 5. The difference in level between the end of the tube from the Mariotte flask and the end of the aspiration tube of the pump 4 determines the quantity of soap solution admitted at each syphonage. This difference in level can be adjusted by raising or lowering the air admission tube of the Mariotte flask 5'. By this means the quantity of soap admitted at each syphonage may be regulated. Immediately after the first syphoning the water passes from the mixing vessel 3 into the control vessel 6 by means of the syphon 7. In the course of the second transference it carries with it air by means of the suction injector 8. The extent of the drop and the sucking in of the air causes the water to lather during its fall, the quantity of lather depending on the hardness of the water, and the limits of hardness chosen for the calibration of the instrument.

From the vessel 6 the solution runs away slowly by means of a small pipe 9 leaving behind the lather which has been formed.

The column of lather 10 is preferably but not necessarily examined in a vertical direction. In order to do that an electric lamp 11 casting a narrow vertical beam of light is positioned under the control vessel 6, the bottom of which is flat in order to avoid refracting the beam. A photo-electric cell 12 is positioned in the path of the beam of light after it has passed through the column of lather. The cell can be of any known type, photo-emissive, photo-conductive, photo-voltaic, or blocking layer. In the form illustrated the cell is provided with a central bore for the passage of the supply tube to the vessel 6. The current which may be amplified if desired, is recorded on a galvanometer 13 which may function as a relay controlling the warning apparatus unless it is preferred to make use of a separate electromagnetic relay.

It is clear that the invention is not limited to the particular form described above.

For example, the mixing of the solutions and the drawing in of the air may be effected by means of a single suction injector placed at any convenient point in the apparatus, a mechanical shaker being used to produce a lather.

What I claim and desire to secure by Letters Patent is:—

1. An automatic apparatus for the determination of hardness of water comprising a vessel into which flows the water the hardness of which is to be measured, a syphon in said vessel to remove therefrom a definite quantity of water for each determination, a suction injector in the tube from said syphon and adapted to introduce into the water a definite quantity of soap solution, a further vessel into which the mixture of water and soap solution passes whence it is transferred by means of another syphon, a suction injector in the tube from this syphon and adapted to introduce into the mixture a quantity of air whereby a lather is formed, a source of electromagnetic radiations adapted to cast a beam through the lather formed, a photo-electric cell in the path of the beam after it has passed through the lather, and means for measuring the current passing through the cell.

2. An automatic apparatus for the determination of hardness of water comprising a vessel into which flows the water the hardness of which is to be measured, a syphon in said vessel to remove therefrom a definite quantity of water for each determination, a suction injector in the tube from said syphon and adapted to introduce into the water a definite quantity of soap solution, a further vessel into which the mixture of water and soap solution passes whence it is transferred by means of another syphon, a suction injector in the tube from this syphon and adapted to introduce into the mixture a quantity of air whereby a lather is formed, a cylindrical vessel for the lather formed, a source of electromagnetic radiations adapted to cast a beam along the axis of said vessel, a photo-electric cell in the path of the beam after it has passed through the vessel and means for measuring the current passing through the cell.

3. An automatic apparatus for the determination of hardness of water comprising a vessel into which flows the water the hardness of which is to be measured, a syphon in said vessel to remove therefrom a definite quantity of water for each determination, a suction injector in the tube from said syphon and adapted to introduce into the water a definite quantity of soap solution, means for agitating this mixture with air, a vessel for the lather formed, means at the bottom of said vessel to allow liquid to pass away, a source of electromagnetic radiations adapted to cast a beam through the lather formed, a photo-electric cell in the path of the beam after it has passed through the lather and means for measuring the current passing through the cell.

4. An automatic apparatus for the determination of hardness of water comprising a vessel into which flows the water the hardness of which is to be measured, a syphon in said vessel to remove therefrom a definite quantity of water for each determination, a suction injector in the tube from said syphon and adapted to introduce into the water a definite quantity of soap solution, means for agitating this mixture with air, a vessel for the lather formed, means at the bottom of said vessel to allow the liquid to pass away, a source of electromagnetic radiations adapted to cast a beam vertically through the lather formed, a photo-electric cell in the path of the beam after it has passed through the lather and means for measuring the currents passing through the cell.

5. An automatic apparatus for the determination of hardness of water comprising a vessel into which flows the water the hardness of which is to be measured, a syphon in said vessel to remove therefrom a definite quantity of water for each determination, a suction injector in the tube from said syphon and adapted to introduce into the water a definite quantity of soap solution, a further vessel into which the mixture of water and soap solution passes whence it is transferred by means of another syphon, a suction injector in the tube from this syphon and adapted to introduce into the mixture a quantity of air whereby a lather is formed, a cylindrical vessel with axis vertical for the lather formed, means at the bottom of said vessel to allow liquid to pass away, a source of electromagnetic radiations adapted to cast a beam along the axis of said vessel, a photo-electric cell in the path of the beam after it has passed through the vessel and means for measuring the current passing through the cell.

CECILE MARGUERITE ROY.